United States Patent
Takahashi

(10) Patent No.: US 6,589,037 B2
(45) Date of Patent: Jul. 8, 2003

(54) DEVICE FOR COVERING A CORE OF A FOOTHOLD WITH SYNTHETIC RESIN

(75) Inventor: Eizo Takahashi, Saitama-ken (JP)

(73) Assignee: Miyama Kogyo Kabushiki Kaisha, Saitama-ken (JP)

( * ) Notice: Subject to any disclaimer, the term of this patent is extended or adjusted under 35 U.S.C. 154(b) by 154 days.

(21) Appl. No.: 09/912,734

(22) Filed: Jul. 25, 2001

(65) Prior Publication Data

US 2002/0197344 A1 Dec. 26, 2002

(30) Foreign Application Priority Data

Jun. 21, 2001 (JP) ......................................... 2001-187483

(51) Int. Cl.[7] ........................... B29C 45/14; B29C 70/70
(52) U.S. Cl. ........................... 425/125; 249/91; 264/278; 425/116
(58) Field of Search ................................ 425/116, 117, 425/125; 264/278; 249/91; 182/90

(56) References Cited

U.S. PATENT DOCUMENTS

| | | | | |
|---|---|---|---|---|
| 2,179,412 A | * | 11/1939 | Keuthan | |
| 2,890,505 A | * | 6/1959 | Brand | |
| 3,363,040 A | * | 1/1968 | Aoki | |
| 4,470,786 A | * | 9/1984 | Sano et al. | |
| 4,702,349 A | * | 10/1987 | Zenhausern | |
| 4,771,861 A | * | 9/1988 | Zenhausern et al. | |
| 4,778,032 A | * | 10/1988 | Takahashi | |
| 4,869,342 A | * | 9/1989 | Borst | |
| 5,639,403 A | * | 6/1997 | Ida et al. | |

* cited by examiner

*Primary Examiner*—Robert Davis
(74) *Attorney, Agent, or Firm*—Flynn, Thiel, Boutell & Tanis, P.C.

(57) ABSTRACT

There is provided a device for covering a core of a foothold with a synthetic resin capable of certainly and easily holding the core for the foothold in a floating state, enabling one supply passage to supply the synthetic resin so as to cover the outer periphery of the core for the foothold with the synthetic resin, eliminating a surface where the synthetic resins are mixed with each other as made in the prior art, thereby manufacturing a strong foothold. The device comprises a lower mold for holding the core of the foothold, an upper mold for covering the upper portion of the core, wherein a plurality of pins stand upright on the lower mold, which pins are urged by springs at portions corresponding to a tread and leg portions of the foothold, pistons for fixing the core to portions in the vicinity of both ends of the portion corresponding to the tread are provided in the back and forth direction of the core while opposing the core.

1 Claim, 5 Drawing Sheets

DEVICE FOR COVERING A CORE OF A FOOTHOLD WITH SYNTHETIC RESIN

BACKGROUND OF THE INVENTION

1. Field of the Invention

The invention relates to a device for covering a core of a foothold with a synthetic resin which device comprises a lower mold for holding the core of the foothold and an upper mold for covering the upper portion of the core.

2. Related Art

There is a conventional device for covering a U-shaped core of a foothold with a synthetic resin which device comprises a lower mold for holding the core of the foothold and an upper mold for covering the upper portion of the core, as shown in FIG. 4, wherein a core 31 for the foothold which is placed on a lower mold 30 is held in a floating state by a plurality of interval holding members 32, 32, . . . respectively made of a synthetic resin and arranged at side portions and a tread of the foothold, and the synthetic resin is supplied to the outer periphery of the core 31 for the foothold by an injection molding assembly 33 so as to cover the core 31 for the foothold with the synthetic resin.

However, when the core 31 for the foothold is held in a floating state, the interval holding members 32, 32, . . . have to be manufactured in advance by a synthetic resin, and some interval holding members arranged on the side portions are different in a shape from those arranged on the tread, and hence the interval holding members 32, 32, . . . were difficult to be manufactured and troublesome to be attached to the core 31. Further, when the core of the foothold is covered with the synthetic resin by this conventional device shown in FIG. 4, a synthetic resin 34 for covering the core 31 is not mixed with a synthetic resin of the interval holding members 32, 32, . . . at the portion where the interval holding members 32, 32, . . . as shown in FIG. 5 are attached to the side portions and the tread, causing a problem that the strength at that portion becomes weak. Further, since the synthetic resin 34 is prevented from flowing by the attachment of the interval holding members 32, 32, . . . , it was necessary to provide a plurality of supply passages 35 of the synthetic resin 34.

SUMMARY OF THE INVENTION

The invention has been made in view of the foregoing problems of the prior art, and it is an object of the invention to provide a device for covering a core of a foothold with a synthetic resin capable of certainly and easily holding the core for the foothold in a floating state, enabling one supply passage to supply a synthetic resin so as to cover the outer periphery of the core for the foothold with the synthetic resin, eliminating a surface where synthetic resins are mixed with each other as made in the prior art (namely, the mixture of the synthetic resin of the interval holding members 32, 32, . . . and that of the synthetic resin 34) so as to manufacture a strong foothold.

To achieve the above objects, the device for covering the core of the foothold with a synthetic resin comprises a lower mold for holding the core of the foothold, an upper mold for covering the upper portion of the core, wherein a plurality of pins stand upright on the lower mold, which pins are urged by springs at portions corresponding to a tread and leg portions of the foothold, pistons for fixing the core to portions in the vicinity of both ends of the portion corresponding to the tread are provided in the back and forth direction of the core while opposing the core, a supply port of a synthetic resin is defined in the upper mold, and a supply passage for supplying the synthetic resin is defined in the boundary between the upper and lower molds at the outer peripheral surface of the core.

PREFERRED EMBODIMENT OF THE INVENTION

Figure 1:
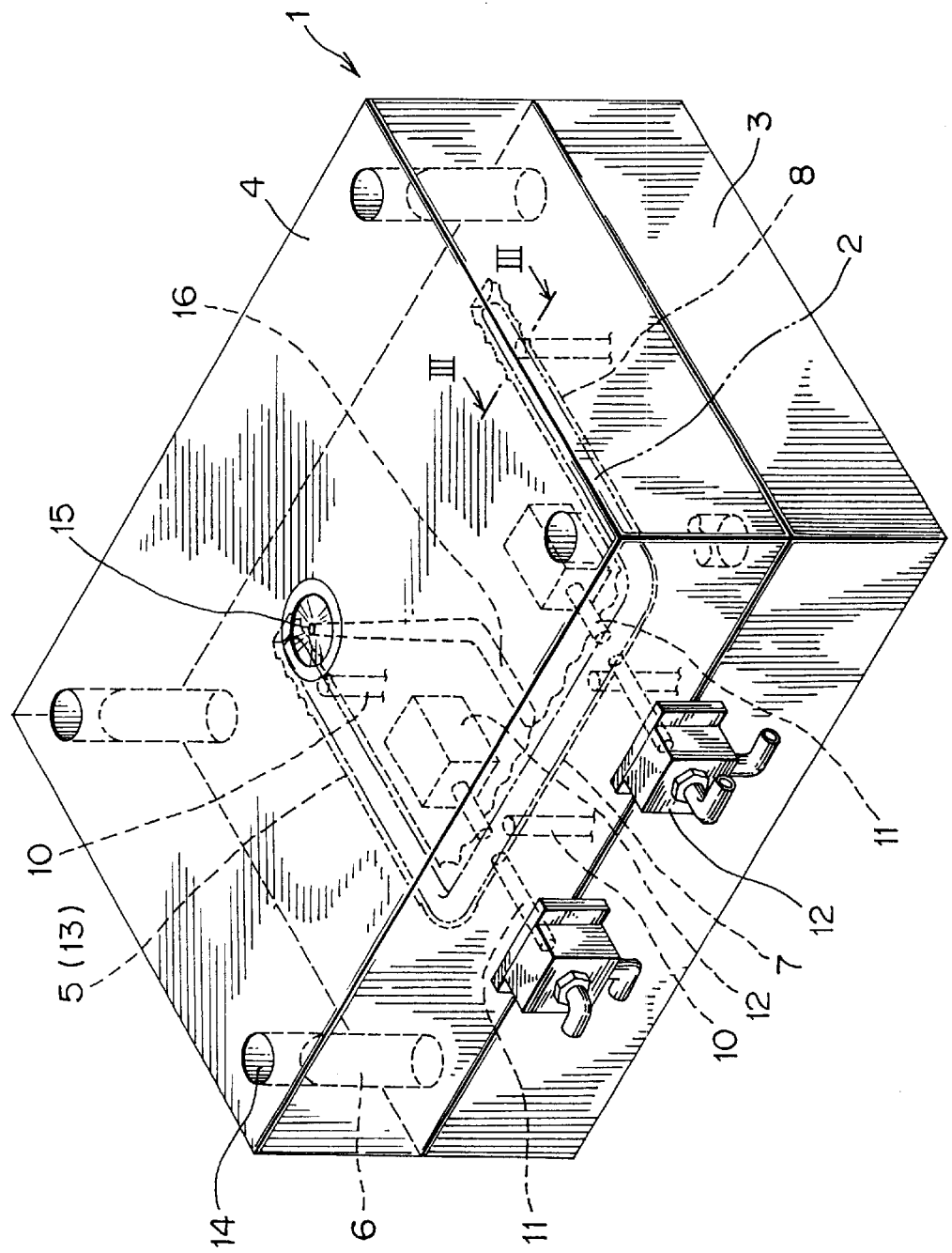
FIG. 1 is a perspective view of a device for covering a core of a foothold with a synthetic resin according to a preferred embodiment of the invention.
Figure 2:
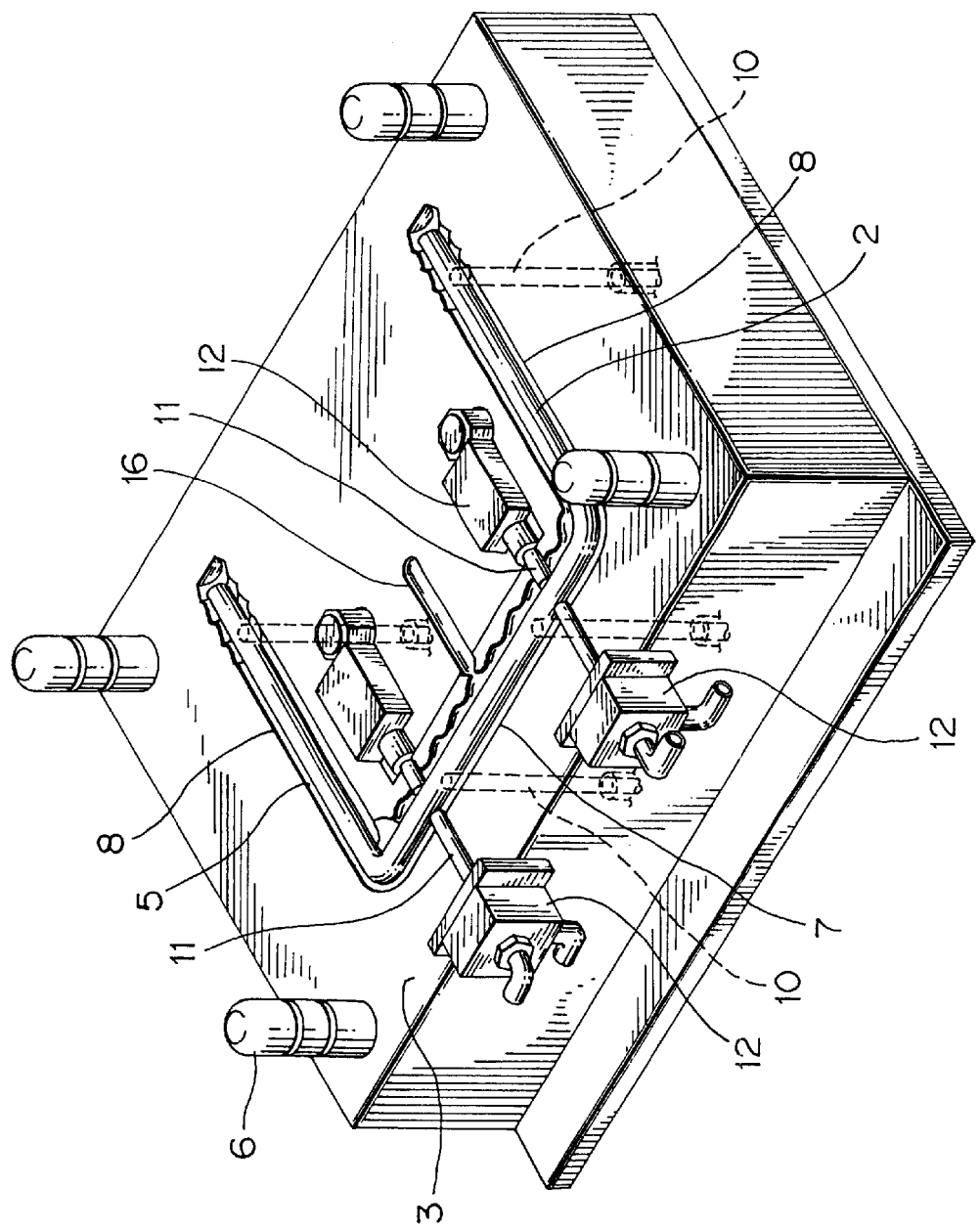
FIG. 2 is a perspective view showing the installation of the core on a lower mold of the device in FIG. 1.
Figure 3:
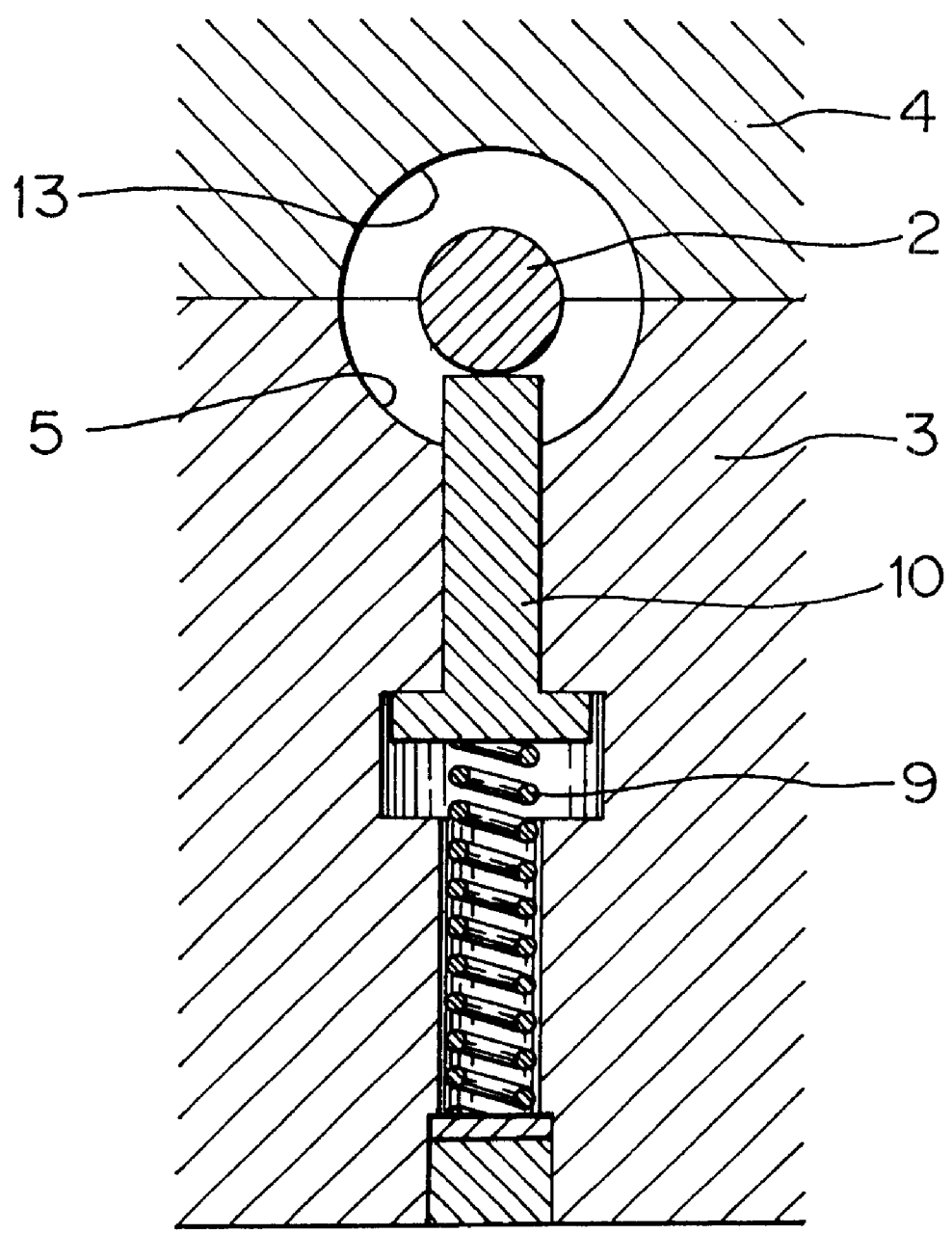
FIG. 3 is an enlarged sectional view taken along lines III—III in FIG. 1.
Figure 4:
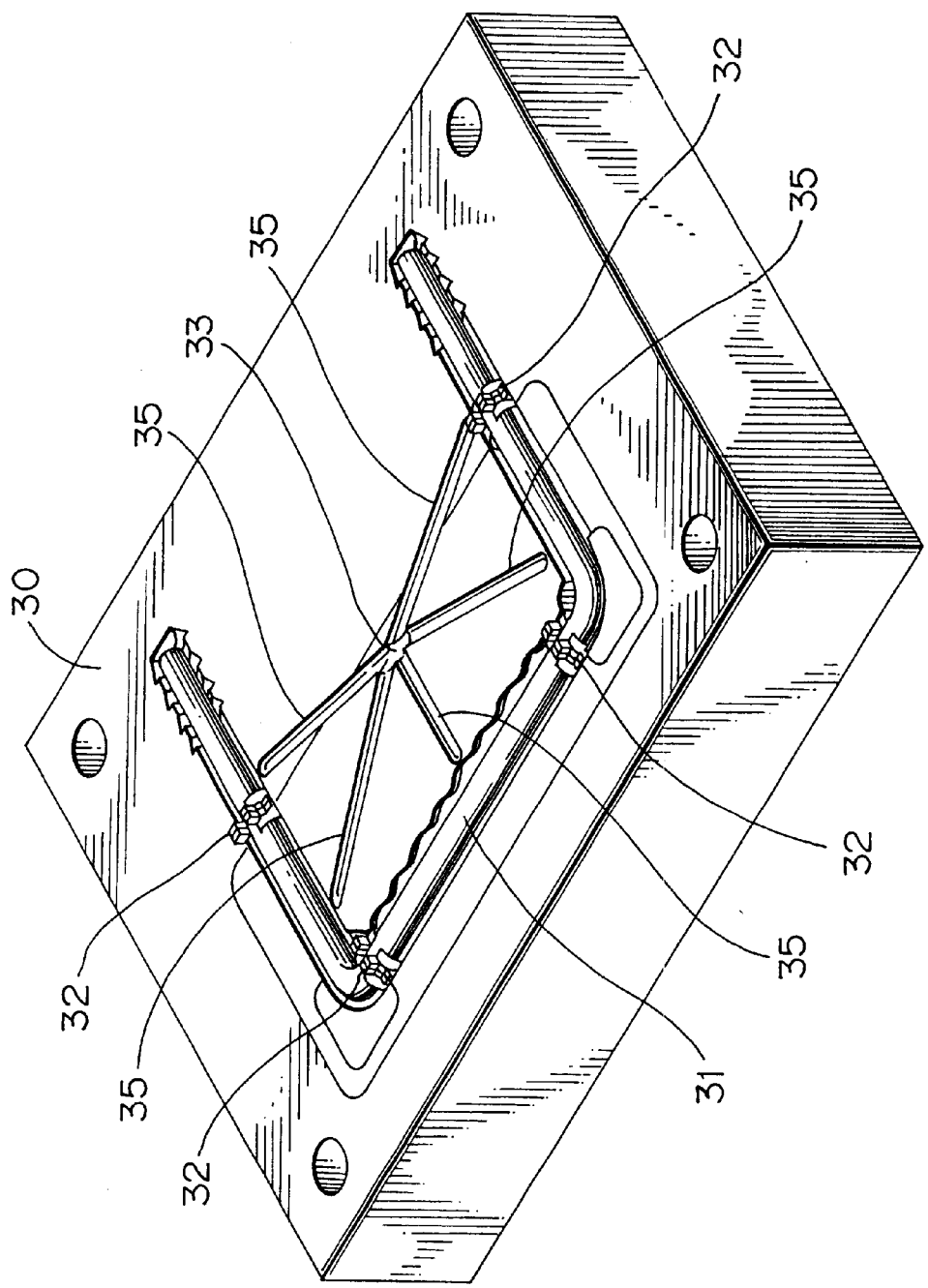
FIG. 4 is a perspective view showing the installation of a core on a lower mold of a conventional device for covering a core of a foothold with a synthetic resin.
Figure 5:
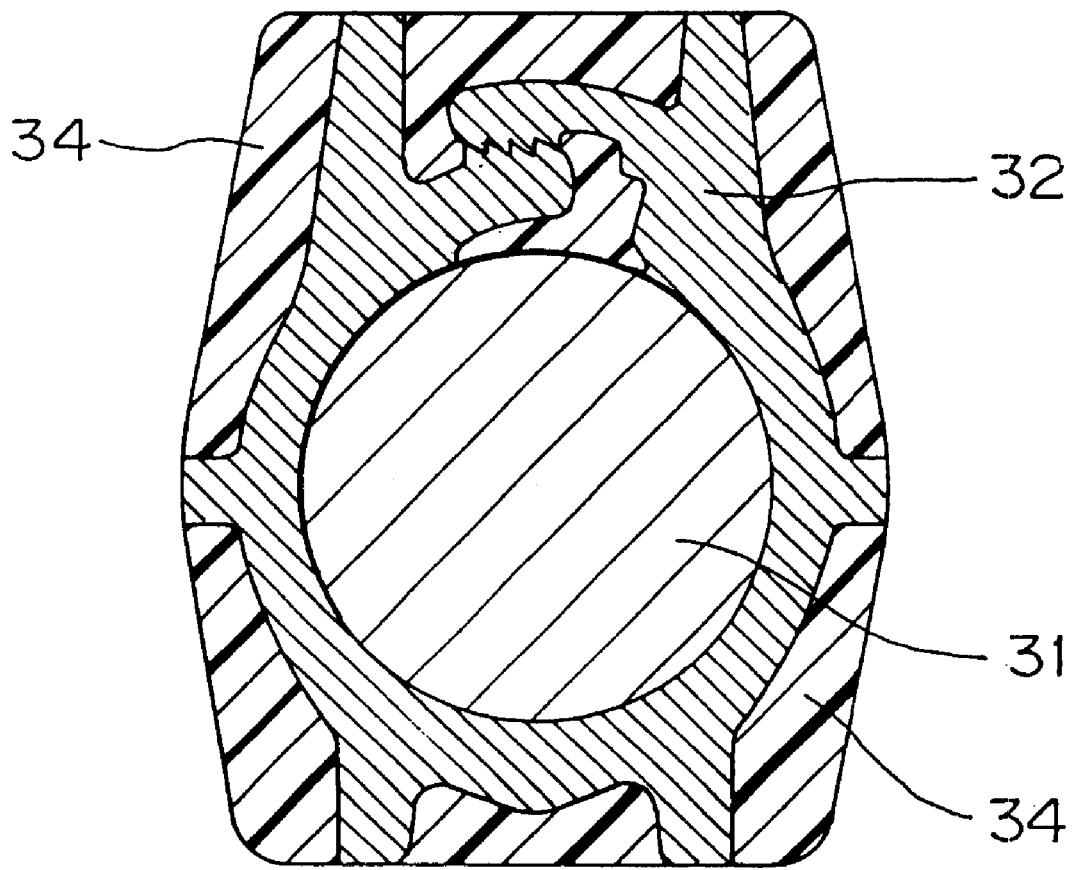
FIG. 5 is a sectional view of a portion where interval holding members are attached to the tread and side portions when the core of the conventional foothold is covered with a synthetic resin.

FIGS. 1 to 3 relate to a device for covering a core of a foothold with a synthetic resin according to a preferred embodiment of the invention, wherein FIG. 1 is a perspective view of the device for covering the core of the foothold with a synthetic resin according to the invention, FIG. 2 is a perspective view showing the installation of the core on a lower mold of the device in FIG. 1, and FIG. 3 is an enlarged sectional view taken along lines III—III in FIG. 1.

In FIGS. 1 to 3, depicted by 1 is the device for covering the core of the foothold with a synthetic resin, and the device 1 comprises a lower mold 3 for holding a U-shaped core 2 and an upper mold 4 for covering the upper portion of the core 2.

The lower mold 3 is rectangular parallelepiped, and a casting mold 5 for molding a lower half of the entire foothold is formed on the upper surface of the lower mold 3 and the core 2 of the foothold is held by the casting mold 5. Further, protrusions 6, 6, . . . for aligning with and positioning an upper mold 4 at four portions in the vicinity of four corners of the upper surface of the lower mold 3.

A plurality of pins 10, 10, . . . , which are respectively urged by springs 9, stand upright at the portion corresponding to a tread 7 and leg portions 8, 8 of the foothold inside the casting mold 5 so as to allow the core 2 to be in a floating state.

Further, pistons 11, 11, . . . for fixing the core 2 are provided at the portions in the vicinity of both ends of the corresponding tread 7 of the core 2 in the back and forth direction of the core 2 while they oppose each other. The pistons 11, 11, . . . are operable back and forth, for example, by hydraulic cylinders 12, 12, . . . . The pistons 11, 11, . . . may be operable by use of a magnetic energy of a magnet.

The upper mold 4 is also rectangular parallelepiped, and a casting mold 13 for molding an upper half of the entire foothold is formed on the back surface of the upper mold 4, and the casting mold 13 covers the upper portion of the core 2 of the foothold. Holes 14, 14, . . . are formed, corresponding to the protrusions 6, 6, . . . of the lower mold 3, on the portions in the vicinity of four corners of the back surface of the upper mold 4 so as to engage with the protrusions 6, 6, . . . . A supply port 15 for supplying a synthetic resin is defined in the portion in the vicinity of the central portion of the upper surface of the upper mold 4, and a supply passage 16 is defined in the boundary between the upper mold 4 and the lower mold 3 for supplying the synthetic resin on the outer peripheral surface of the core 2.

With the device 1 for covering the core of the foothold with a synthetic resin having the foregoing construction, the core 2 is first placed on the four pins 10, 10, ... in the casting mold 5 of the lower mold 3 for allowing the core 2 in a floating state, and the position of the core 2 is fixed by the pistons 11, 11, .... Thereafter, the protrusions 6, 6, ... of the lower mold 3 are inserted into the holes 14, 14, ... of the upper mold 4 and the lower mold 3 is overlaid on the upper mold 4 to hermetically seal the inside of the casting molds 5, 13.

When a given amount of a synthetic resin is ejected and supplied from the supply port 15 of the upper mold 4, the synthetic resin passes through the supply passage 16 defined in the boundary between the upper mold 4 and the lower mold 3 and is supplied to the entire inner portions of the casting molds 5, 13, and the outer peripheral surface of the core 2 is covered with this synthetic resin.

At this time, in a flowing state where a synthetic resin is not hardened considering the amount and time of supply of the synthetic resin, e.g. upon elapse of a given time at the proper final discharging time of the synthetic resin, the pistons 11, 11, ... are moved backward to move away from the core 2 so that the synthetic resin which has been finally discharged flows to completely cover the outer periphery of the core 2, and hence the outer periphery of the core 2 is covered with the synthetic resin without leaving holes as traces of the pistons 11, 11, .... Further, at the portions where the pins 10, 10, ... for allowing the core 2 in a floating state are formed, the upper surface of each pin 10 is pressed by a pressure of the synthetic resin flowing through the casting molds 5, 13 and it is lowered by the springs 9 provided under each pin 10 by a thickness substantially the same as the thickness of the synthetic resin covering the core 2 (see FIG. 3), so that the synthetic resin also flows to the portion where each pin 10 contacts the core 2, thereby completely covering the outer periphery of the core 2, and hence the outer periphery of the core 2 is covered with the synthetic resin without leaving holes as traces of the pins 10.

Since the device 1 has only one supply section for supplying a synthetic resin, there is no surface where synthetic resins are mixed with each other as made in the conventional device so that the core can be covered with the synthetic resin, thereby manufacturing the foothold.

Although the device 1 is exemplified to have the upper mold 4 and the lower mold 3 which are arranged up and down or vertically according to the preferred embodiment of the invention, the upper mold 4 and the lower mold 3 may be arranged right and left or horizontally, while the core 2 of the tread 7 may be positioned above. In this case, the pins 10, 10, ... may be formed on the upper mold 4 while opposing the lower mold 3 so that the core 2 can be certainly rendered in a floating state.

The device for covering the core of the foothold with a synthetic resin according to the preferred embodiment of the invention comprises the lower mold for holding the core of the foothold, and the upper mold for covering the upper portion of the core wherein a plurality of pins which are urged by the springs stand upright on the lower mold at the portions corresponding to the tread and leg portions of the foothold and the pistons for fixing the core at the portions in the vicinity of both ends of the portions corresponding to the tread in the back and forth direction of the core while opposing the core 2, and wherein the supply port for supplying a synthetic resin is defined in the upper mold, and a supply passage for supplying the synthetic resin to the outer peripheral surface in the boundary between the upper and lower mold, it is possible to certainly and easily hold the core for the foothold in a floating state, to enable one supply passage to supply the synthetic resin so as to cover the outer periphery of the core for a foothold with the synthetic resin, while eliminating a surface where the synthetic resins are mixed with each other so as to manufacture a strong foothold.

What is claimed is:

1. A device for covering the core of the foothold with a synthetic resin comprising a lower mold for holding the core of the foothold, an upper mold for covering the upper portion of the core, wherein a plurality of pins stand upright on the lower mold, which pins are urged by springs at portions corresponding to a tread and leg portions of the foothold, pistons for fixing the core to portions in the vicinity of both ends of the portion corresponding to the tread are provided in the back and forth direction of the core while opposing the core, a supply port of the synthetic resin is defined in the upper mold, and a supply passage for supplying the synthetic resin is defined in the boundary between the upper and lower molds at the outer peripheral surface of the core.

* * * * *